United States Patent [19]

Longstaff

[11] Patent Number: 5,022,181

[45] Date of Patent: Jun. 11, 1991

[54] METHOD AND APPARATUS FOR USE IN PLANT GROWTH PROMOTION AND FLOWER DEVELOPMENT

[75] Inventor: Eric Longstaff, Fulton County, Ga.

[73] Assignee: R. E. I., Inc., Alpharetta, Ga.

[21] Appl. No.: 450,593

[22] Filed: Dec. 14, 1989

Related U.S. Application Data

[63] Continuation of Ser. No. 60,749, Jun. 10, 1987, abandoned.

[51] Int. Cl.$^5$ .............................................. A01G 9/22
[52] U.S. Cl. .......................................... 47/31; 47/58; 47/DIG. 6
[58] Field of Search .............. 97/58, DIG. 6, 1 R, 97/26, 28.1, 29, 31

[56] References Cited

U.S. PATENT DOCUMENTS

| | | | |
|---|---|---|---|
| 2,391,959 | 1/1946 | Gallowhur | 2/78 |
| 2,874,612 | 2/1959 | Luboshez | 88/60 |
| 3,352,058 | 11/1967 | Brant | 47/58 |
| 4,062,146 | 12/1977 | Grossman et al. | 47/17 |
| 4,134,875 | 1/1979 | Tapia | 260/42.46 |
| 4,179,547 | 12/1979 | Allingham et al. | 525/2 |
| 4,235,043 | 11/1980 | Harasawa et al. | 47/1.4 |
| 4,529,269 | 7/1985 | Mutzhas | 350/312 |
| 4,788,793 | 12/1988 | Kaokade | 47/DIG. 6 X |

FOREIGN PATENT DOCUMENTS

| | | |
|---|---|---|
| 2906306 | 8/1979 | Fed. Rep. of Germany . |
| 3223445 | 12/1983 | Fed. Rep. of Germany . |
| 3027540 | 3/1978 | Japan . |
| 4068850 | 6/1979 | Japan . |
| 4097273 | 8/1979 | Japan . |
| 4127945 | 10/1979 | Japan . |
| 1540568 | 2/1979 | United Kingdom . |
| 1586687 | 3/1981 | United Kingdom . |
| 2097810 | 11/1981 | United Kingdom . |

Primary Examiner—Robert A. Hafer
Assistant Examiner—Kevin G. Rooney
Attorney, Agent, or Firm—Louis T. Isaf

[57] ABSTRACT

Method and apparatus for encouraging maximal plant growth which method and apparatus comprise a light filter which prevents the natural decay of plant growth stimulating materials by absorption of UV radiation while permitting photosynthesis to occur with blue light in the absence of attendant heat generating and dehydrating radiations caused by green, yellow and infra-red light. The objective is made possible according to the preferred embodiment of the invention by interposing separately, continuously, or discontinuously, a combination of filters made of solid material between the sun and the growing plants which block out radiation in those wave lengths which are either physiologically harmful or which retard growth, but do not inhibit those wavelengths which are necessary for photosynthesis, metabolism, differentiation and development.

28 Claims, 1 Drawing Sheet

METHOD AND APPARATUS FOR USE IN PLANT GROWTH PROMOTION AND FLOWER DEVELOPMENT

This application is a continuation of application Ser. No. 07/060,749, filed June 10, 198 now abandoned.

FIELD OF THE INVENTION

The current invention relates to green plant growth promoting apparatus for use in maximizing the production of food crop and flowering plants. It involves the provision of several specially constituted thermoplastic screens which offer singley or in combination shade from the auxin-destroying UV radiation, the growth retarding photosynthesis-unusable green and infra-red light of the sun, but the same time, will optimize the photosynthesis rate of the plant and encourage rapid growth. In addition, by careful selection of the screen wavelength combinations, growth control and flowering may be managed by those skilled in the art of horticulture.

BACKGROUND OF THE INVENTION

Numerous attempts have been made to control the growth environment of crop plants so as to improve yield and control the timing of flowering. These include providing shelter from wind and heavy rain, as for example by errection of a "greenhouse", or by applying various chemicals which control growth by simulating the effects of the natural plant hormones. Inevitably there is a trade off, in the case of the greenhouse, scorching becomes a problem due to light focussing and the overheating created by the "greenhouse effect" of trapping radiant energy, whereas in the case of chemical application there are attendent problems associated with residues both in the food crop and in the soil.

In order to understand fully the significance of the current invention it is first necessary to review the constitution of terrestrial sunlight and to realize how plants exploit this radiation.

Terrestrial sunlight has been considered to consist of shortwave ultraviolet light (UV-B, 290-320 nm), long-wave ultra-violet light (UV-A, 320-400 nm), visible light (400-700 nm) and infra-red light (700-2500 nm). On a clear day at sea level, the distribution of solar radiation is about 1-2% UV, 42% visible and 57% infrared. It is now generally recognized that the UV-B radiation is dangerous to all living cells leading to various genotoxic disorders by mutation and will cause, at high enough exposure levels, plant and animal cell death. UV-A on the other hand is apparently harmless to animal tissues at natural radiation levels, but green plants have utilized the hormone-destroying effect of UV-A light to control or regulate their growth, while protecting themselves as best they can from the dangerous UV-B rays with the pigment chlorophyll. It has been known since Darwin's time that plants produce a growth stimulating substance (hormone or auxin) near their growth tips which diffuses downwards promoting further growth and that if completely shaded, plants will grow, for a limited period, at about three times their illuminated rate (e.g. "forcing" of hyacynthe or rhubarb shoots) and that the bending of plants towards light is caused by the protection of the auxin from light denaturation on the darkside of plants grown on say a window sill. The specific wave-lengths of light which denature auxins lie in the UV-range, 290-340 nm and the photolysis of such auxins can occur even at quite meager light intensities. Prevention of photolysis would render the plants continuously sensitive to their own growth stimulation. In a similar manner, the induction of flower formation and development has been determined to be influenced by the presence and the intensity of natural red light and consequently flowering may be encouraged or delayed by manipulating the filtered environment so as to provide or absorb those wavelengths responsible. It is the purpose of this invention to provide such an environment or environments.

SUMMARY OF THE INVENTION

Briefly described, the present invention provides method and apparatus for encouraging maximal plant growth which method and apparatus comprise a light filter which prevents the natural decay of plant growth stimulating materials by absorption of UV radiation while permitting photosynthesis to occur with blue light in the absence of attendant heat generating and dehydrating radiations caused by green, yellow and infra-red light. The objective is made possible according to the preferred embodiment of the invention by interposing a combination of filters made of solid material between the sun and the growing plants which block out radiation in those wavelengths which are either physiologically harmful or which retard growth, but do not inhibit those wavelengths which are necessary for photosynthesis, metabolism, differentiation and development.

The apparatus of the preferred embodiment of the present invention comprises at least three filters employed either together, separately, continuously, or discontinuously, as a canopy above growing plants.

It is recorded in the prior art that plants may be protected from solar radiation by the provision of a single filter which will simultaneously and selectively absorb UV and other radiations to protect plants from physiologically dangerous radiation (e.g. wavelengths of 300-330 nm, in Mutzhas, U.S. Pat. No. 4,200,360); however, the present invention allows the nurseryman to vary the wavelength range and intensity continuously, and during the growth of his crop. The advantage here is that various stages of plant development such as flowering or fruiting may be modified and managed as well as the rate of the plants growth.

Other objects, features and advantages of the present invention will become apparent upon reading and understanding this specification in conjunction with the drawings.

DETAILED DESCRIPTION OF THE PREFERRED EMBODIMENT

Attention is now directed to more specific details of preferred embodiments of the method and apparatus of the present invention, with reference in greater detail to the drawings. In accordance with the present invention, a filter assembly 10 displays selective and variable radiation absorption features. In the preferred embodiment, the filter assembly 10 comprises three screens 12, 14, 16 (or three sets of screens 12, 14, 16).

Figure 1:
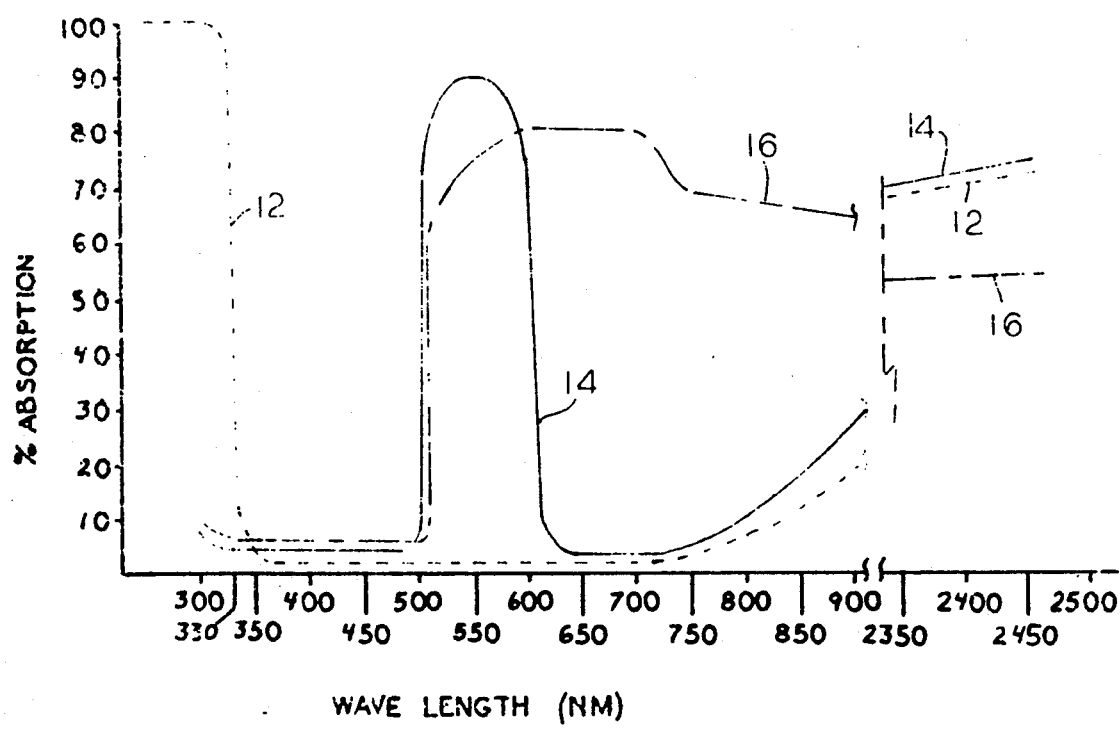
FIG. 1 is a graph representing the selective absorption of wavelengths of sunlight, in accordance with a preferred embodiment of the present invention.

The outer screen 12 of the three screens provides a mechanism by which the plants may be protected from harmful UV radiation. The outer screen 12 is constituted so as to exclude from the growing plants, by absorption, that portion of UV-light known to cause DNA damage and denaturation of the naturally occurring plant growth promoters and auxins, but at the same time to transmit as much white light and infra-red as practical. The wavelengths to be absorbed by this outer filter screen 12 lie, therefore, in the range 290–340 nm. (See FIG. 1.)

A suitable material for the outer screen 12 is any thermoplastic material or acrylic resin in the form of either a thin film or woven or laminated material but exhibiting the property of being transparent to solar energy wavelengths above 340 nm which are those associated with heat and photosynthesis. Suitable materials for the outer screen 12 when in film form are resins of polyvinyl chloride, polyolefins such as polyethylene and polypropylene, or acrylic resins such as polymethylmethacrylate. Copolymers such as polyethylene/vinyl acetate and butadiene/styrene would also suffice. Such resins may also include plasticisers such as phthallate esters. The outer screen 12 includes UV absorbers of various chemical types at such concentration to provide both longevity to the material and selective absorption of UV below 340 nm. It is preferrable that the outer screen 12 shall not have significant absorption, i.e. greater than 20%, of the natural wavelengths of light above 340 nm. In preferred embodiments of the present invention, the UV absorbers constitute between 0.01 and 0.5% by weight of the screen material. An example of a suitable UV absorber is (2-Chloroethyl) phosphate or acetophenone at a concentration of 0.1 w/w. Another example of a suitable absorber is 2[2 hydroxy - 5 menthylphenyl] benzotriazole at a concentration of 0.05% w/w.

A preferred material for the outer screen is polyethylene film of thickness between 100 and 300 microns, for example 200 microns, and this may be a single film or a laminate form with a reinforcing nylon or polyester net to give greater physical strength. The resin should also be light stable and non-volatile at the relatively high temperatures used in blow forming, extrusion or callendering of lay-flat film. (i.e. about 150° C.) It is also essential according to the invention that the outer film be not polished, and, preferrably, it should be finished as a matte or taffeta surface to provide a light diffusion effect. The growth of plants is enhanced by diffused rather than direct light.

The second screen 14, which is, preferrably, arranged between the outer screen 12 and the growing plants, provides, in the preferred embodiment, protection from the unnecessary heating effect of light within the spectral wavelength ranges 510–610 nm and 800–2500 nm. (See FIG. 1.). In the preferred embodiment, the second screen 14 is comprised of a set of two screening films. These two films making up the second set of screens are ideally identical to each other although not necessarily so. The objective of this set is to provide the plants, at the discretion of the nurseryman, with an optional single or double degree of shade from heat (800–2500 nm) and intense green and yellow light (510–610 nm) but permitting maximum photosynthesis, synthesis of chlorophyll and photomorphogenesis, to occur. These screens should absorb maximally within the wavelength range 510–610 nm and consequently appear purple or violet in colour. Suitable materials for these screens are as described for the outer screen 12 but there is no necessity to include UV absorbers and a suitable thickness is between 100–300 microns. However, included in these screens according to the present invention and to achieve the objective of absorbing light in the range 510–610 nm, a pigment such as CI pigment Violet 37 (carbazole dioxazine) must be included in the formulation of the said screens at a concentration of, for example, 0.05% w/w. This same pigment accomplishes the desired absorption of infra-red radiation of wavelengths between 800 nm and 2500 nm. Preferably, the pigment or dye used is heat and light stable. Care must be taken however when selecting a suitable pigment that little, if any, absorption occurs in the photosynthesis-essential ranges of 340–510 nm (blue) and 610–710 nm (red). A combination of the previously described, UV absorbing, outer screen 12 and this second screen 14 (or set of screens 14) absorbing green, yellow and infra-red light, provide the plants with selected solar protection. Experience has shown growth rates to be enhanced by up to three times the unprotected rate. This combination of screens has been shown to encourage growth and development, especially of young plants.

In order to delay the flowering and fruiting of mature plants, it is necessary to provide, according to the invention, a third screen 16, comprising a set of at least one additional or alternative filter which will absorb those wavelengths of light known to be effective in inducing flowering, i.e. red light in the range 610–710 nm. Provision of this third screen filter 16, either in combination with the outer screen 12 and the second set of screens 14 previously described, or in combination with just the outer screen 12, will permit synchronisation of plant growth and flowering. When flowering is required, the nurseryman has simply to remove this third screen filter 16 which absorbs light in the range 510–710 nm and replace it by the second screen 14 which transmits red light in the range 610–710 nm. This third screen 16, in the preferred embodiment, also absorbs infra-red radiation (800–2500 nm). The objective of the third screen filter 16 is achieved by constructing a filter material as that previously described for the second set 14 but including in the formulation a pigment which will absorb substantially only red, green and yellow light in the range 510–710 nm, but which will transmit light in the blue region of the spectrum, i.e. between 340 and 500 nm. (See FIG. 1.) Such a filter will appear blue and a table pigment would be, for example, CI pigment blue 60 (Cromosuipthal Blue A3R, Indanthone blue). This same pigment accomplishes desired absorption of infra-red radiation of wavelengths in the range 800 nm and 2500 nm. Preferrably, the pigment or dye utilized is heat and light stable.

It is seen that the filter assembly 10 of the present invention functions as a growth regulator and promoter and that each of the three screens 12, 14, 16 individually contributes to the ideal photosynthetic and development needs of green plants. Because any one green plant does not use the same wavelengths of solar radiation at different times during its growth and development, the present invention provides a means whereby the nurseryman can choose which filtered light environment he thinks fit for his crop. This choice of environment is accomplished, in accordance with the preferred embodiment, by selectively interposing one or more of the filter screens 12, 14, 16 between the growing plants and sun.

Furthermore, in addition to its functions as a growth regulator and promoter, the present invention provides environmental control by eliminating those wavelengths of light which cause overheating, dehydration and wilting. These energy-rich wave-lengths of light do their damage without contributing to the photosynthetic capacity of the plant, and, therefore, are of little benefit to the plant during the growth period in the natural environment. Elimination of these rays permit unhindered growth during daylight hours. In order to capitalize on such growth stimulation, the plants so stimulated need to operate their photosynthesis machinery to maximum advantage. Maximal photosynthesis is governed by several limiting factors including temperature (range 68°-86° F.), carbon dioxide concentration (natural limit 0.03%, but ideally 10-15%), water content (plants must remain turgid) and light intensity (ideally about 33% full sunlight intensity). With respect to the current invention, in addition to protecting the plant from mutation and auxin photolysis, the apparatus is capable of controlling photosynthetic rate by preventing overheating and, therefore, excess water loss, and providing the plant with only those wavelengths of light usable in photosynthesis, i.e. red and blue light, thus preventing the growth and photosynthesis retardation effect of high light intensity known as solarization. The apparatus brings maximum advantage to crops grown in hot, arid, high light intensity regions, e.g. Mediterranean and tropical climates, but considerable advantage should be accrued in temperate zones.

Whereas, 100% absorption of radiation within the stated wavelengths is an ideal embodiment of the present invention, the invention is practiced whenever there is absorption of radiation, in any amounts, of any wavelengths within the stated ranges of wavelengths. Preferred embodiments of the present invention absorb biologically significant amounts of radiation of substantially all wavelengths within the stated ranges of wavelengths. One example of a filter assembly 10, in accordance with the present invention, includes an outer screen 12 containing an agent or agents which absorbs at least 80% of the UV radiation within the stated ranges of wavelengths, 290-340 nm; and the second and third sets of screens 14, 16 contain agents which absorbs at least 50% of the respective green/yellow, red and infra-red radiation within the stated ranges of wavelengths (510-610 nm and 800-2500 nm) and (610-710 nm and 800-2500 nm), respectively.

Figure 2:
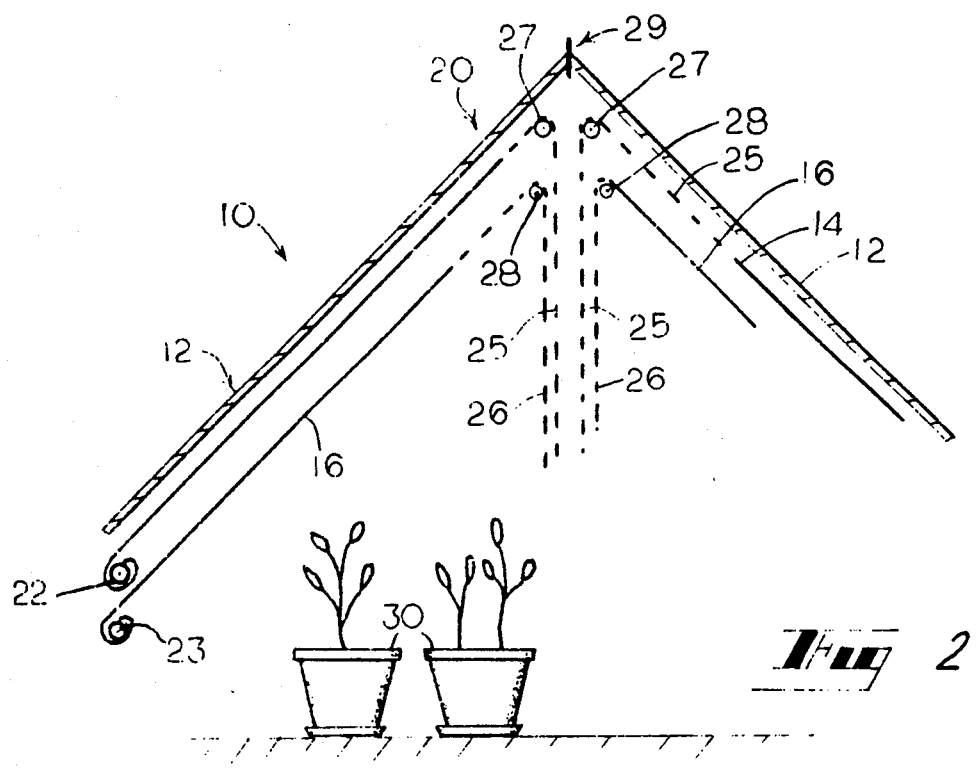
FIG. 2 is a cross-sectional, side view of an apparatus in accordance with the present invention, depicting a preferred embodiment thereof.

A filter assembly 10 in the form of a greenhouse 20 of conventional construction exemplifies a form in which the growth promotors may be supported and varied (See FIG. 2). In such a greenhouse structure 20, the outer screen 12 of the filter assembly 10 forms the semi-permanent weather structure (i.e. roof and sides) of the greenhouse. The second screen 14 and third screen 16 are mounted on rollers 22, 23 inside the greenhouse, between the outer screen 12 and the growing plants 30. Hoisting ropes 25, 26 are connected to the ends of the second screen 14 and third screen 16 and extended over pulleys 27, 28 at the peak 29 of the greenhouse 20. Thus, the second screen 14 and third screen 16 function as blinds or curtains which the nurseryman selectively interposes, alternately or together, between the outer screen 12 and the plants 30 by unrolling and rolling the screens 14, 16 using the ropes 25, 26 and rollers 22, 23. However, the scope of the present invention is not to be limited to the physical structure of a canopy or greenhouse.

In an alternate embodiment of the present invention, the filter assembly 10 comprises only two screens or sets of screens which are employed either together, separately, continuously or discontinuously between the radiation source and the plants. In such an embodiment, one screen (i.e. the stationary screen) possesses the absorption qualities of both outer screen 12 and second screen 14 as described above, and the other screen 16 (i.e. the retractable screen) absorbs, at least, radiation of wavelengths 610-710 nm.

Whereas, the present invention has been described in detail with particular reference to preferred embodiments thereof, it is understood that modifications and variations may be effected within the spirit and scope of the invention, as described before and as defined in the appended claims.

What is claimed is the following:

1. A sunscreening article for the growth promotion of green plants, comprising a plurality of separate screens, a first of said screens comprising first agent means for absorbing at least 80% of the naturally occurring auxin inactivating UV radiation of wavelengths in the range 290-340 nm, and a second of said screens comprising second agent means for preventing transmittal through said second of said screens of at least 50% of the non-photosynthetically useful and growth retarding green/yellow and infra-red light of wavelengths in the ranges 510 to 610 nm and 800 to 2500 nm, respectively, said first screen and said second screen each allowing transmittal therethrough of at least 80% of wavelengths in the range 340-510 nm, said second screen allowing transmittal therethrough of at least 50% of wavelengths in the range 610-710 nm.

2. An article according to claim 1, wherein said screens are constructed of flexible sheet or film, 100-300 microns in thickness.

3. An article according to claim 2, wherein said screens are constructed of a thermoplastic material.

4. An article according to claim 3, wherein the plastic material is a resin chosen from the group of polyvinyl chloride, polyolefin, polyester and an acrylic resin.

5. An article according to claim 1, wherein said first agent means forms between 0.01 and 0.5% by weight of the said first of said screens.

6. An article according to claim 2, wherein said first agent means forms between 0.01 and 0.5% by weight of the said first of said screens.

7. An article to claim 3, wherein said first agent means forms between 0.01 and 0.5% by weight of the said first of said screens.

8. An article according to claim 4, wherein said first agent means forms between 0.01 and 0.5% by weight of the said first of said screens.

9. An article according to claim 1, wherein said second agent means comprises a heat and light stable dye or pigment.

10. An article according to claim 1, wherein said plurality of separate screens comprises a third screen comprising third agent means for preventing transmittal of at least 50% of the available solar radiation within the range 610-710 nm.

11. An article according to claim 10, wherein said third agent means forms less than 1% by weight of said third screen.

12. An article according to claim 10, wherein the third agent means comprises a heat and light stable dye or pigment.

13. An article according to claim 11, wherein the third agent means comprises a heat and light stable dye or pigment.

14. An article according to claim 10, further comprising means for moving said second and third screens relative to one another and relative to said first screen, wherein each screen of said plurality of separate screens can be selectively used in isolation or in combination to create a desirable plant growth or plant development environment.

15. A sunscreening apparatus for growth promotion of green plants, comprising:
first screen means for absorbing at least some UV radiations of at least some wavelengths in the range of 290 to 340 nm, said first screen means acting upon radiation between the source of radiation and the subject green plants;
a second screen means for absorbing at least some radiation of at least some wavelengths in the range of 510 to 610 nm and at least some radiation of wavelengths in the range of 710 to 2500 nm; and
control means for selectively imposing the radiation absorbing action of said second screen means upon radiations between the source of radiation and the subject green plants, while said first screen means is acting upon radiation between the source of radiation and the subject plants.

16. Apparatus of claim 15, wherein said first screen means comprises a sheet of material displaying said absorption qualities and a frame member supporting said sheet of material in an orientation between the sun and the subject plants; and wherein said second screen means comprises a sheet material displaying said absorption qualities; and wherein said control means comprises a roller and rope assembly to which said sheet material of said second screen means is mounted, said roller and rope assembly and said mounted sheet material functioning as a curtain assembly whereby the sheet material is alternately pulled from the roller to a blocking position between the sun and the subject green plants and rolled back onto the roller out of the blocking position.

17. Apparatus of claim 15, further comprising:
a third screen means for absorbing at least some radiation of at least some wavelengths in the range of 610 to 710 nm; and
second control means for selectively imposing the radiation absorbing action of said third screen means between the source of radiation and the subject green plants.

18. An article according to claim 1, wherein said first screen of said plurality of separate screens is finished in an unpolished matte or taffeta surface to provide a light diffusion effect.

19. A sunscreening apparatus for growth promotion of green plants, comprising a plurality of independent screens, each of said screens comprising means for absorbing radiation in a wavelength range different from the wavelength ranges absorbed by each of the other said screens, and means for moving said screens of said plurality of screens relative to one another, wherein each screen is used selectively, either alone or in combination with another screen, to affect specific wavelength radiation levels in the growing environment, through manipulation of said screens.

20. A sunscreening apparatus for growth promotion of green plants, comprising:
first screen means for absorbing at least some UV radiations of at least some wavelengths in the range of 290 to 330 nm, said first screen means acting upon radiation between the source of radiation and the subject green plants;
second screen means for absorbing at least some radiation of at least some wavelengths in the range of 610 to 710 nm; and
control means for selectively imposing the radiation absorbing action of said second screen means upon radiations between the source of radiation and the subject green plants.

21. Apparatus of claim 20, further comprising:
a third screen means for absorbing at least some radiation of at least some wavelengths in the range of 510 to 610 nm and at least radiation of at least some wavelengths in the range of 800 to 2500 nm; and
second control means for selectively imposing the radiation absorbing action of said third screen means between the source of radiation and the subject green plants.

22. A sunscreening apparatus for growth promotion of green plants, comprising:
first screen means for absorbing at least some UV radiations of at least some wavelengths in the range of 290 to 340 nm, said first screen means acting upon radiation between the source of radiation and the subject green plants;
second screen means for absorbing at least some radiations of at least some wavelengths in the range of 610 to 710 nm;
at least one screen means for absorbing at least some radiation of at least some wavelengths in the range of 510 to 610 nm and at least some radiation of at least some wavelengths in the range of 800 to 2500 nm, said one screen means being said first screen means or said second screen means or a third screen means; and
control means for selectively imposing the radiation absorbing action of said second screen means upon radiations between the source of radiation and the subject green plants.

23. Apparatus of claim 22, wherein said one screen means comprises a third screen means; and wherein said apparatus further comprises second control means for selectively imposing the radiation absorbing action of said third screen means between the source of radiation and the subject green plants.

24. Method of promoting growth of green plants, said method comprising the steps of:
continually preventing exposure of the green plants to at least some UV radiation of at least some wavelengths in the range of 290 to 340 nm; and
selectively preventing exposure of the green plants to at least some radiation of at least some wavelengths in the range of 510 to 710 nm and in the range of 800 to 2500 nm.

25. Method of claim 24, further comprising the step of selectively preventing exposure of the green plants to at least some radiation of at least some wavelengths in the range of 610 to 710 nm.

26. Method of promoting growth of green plants, said method comprising the steps of:
continually preventing exposure of the green plants to at least some UV radiation of at least some wavelengths in the range of 290 to 340 nm; and selectively preventing exposure of the green plants to at least some radiation of at least some wavelengths in the range of 610 to 710 nm.

27. Method of claim 26, further comprising the step of selectively preventing exposure of the green plants to at least some radiation of wavelengths in the range of 510 to 710 nm.

28. Method of claim 26, further comprising the step of continually preventing exposure of the green plants to at least some radiation of at least some wavelengths in the range of 510 to 710 nm.

* * * * *